United States Patent [19]
Saner

[11] 3,724,573
[45] Apr. 3, 1973

[54] ELECTRONIC MEASURING APPARATUS FOR MEASURING MASSES AND FORCES

[75] Inventor: Kaspar Saner, Dubendorf, Switzerland

[73] Assignee: Wirth, Gallo & Co., Zurich, Switzerland

[22] Filed: May 9, 1972

[21] Appl. No.: 251,652

[30] Foreign Application Priority Data

Aug. 4, 1971  Switzerland..................11505/71

[52] U.S. Cl.................................................177/210
[51] Int. Cl.................................................G01g 3/14
[58] Field of Search..................177/1, 184, 210, 251; 73/141 A

[56] References Cited

UNITED STATES PATENTS

| 3,423,999 | 1/1969 | Wirth et al.............177/210 UX |
| 3,612,198 | 10/1971 | Galb..........................177/210 |
| 3,621,713 | 11/1971 | Wirth et al...............177/210 X |

Primary Examiner—George H. Miller, Jr.
Attorney—Stevens, Davis, Miller & Mosher

[57] ABSTRACT

Two pretensioned vibrating strings are respectively stressed and stress-relieved by a force to be measured, said force being applied through an adjusting member by which the angle of force application can be varied to compensate initial errors of the apparatus.

3 Claims, 2 Drawing Figures

ELECTRONIC MEASURING APPARATUS FOR MEASURING MASSES AND FORCES

This invention relates to an electronic measuring apparatus, for measuring masses or forces, with an evaluating and indicating device, in which the value which is to be measured acts on the tension of two pretensioned oscillating strings, which are excited by electronic means so that they oscillate laterally. The change in the frequencies of the strings caused by the added mass or force is used for calculating the said value to be measured in the evaluating device and for indicating this value. The two strings and two force transmitting members are fixed to a central body, in such manner that they radiate from this body in a star-like configuration, these force transmitting members serving to transmit a pretensioning force and also a force which is a function of the said value which is to be measured. Measuring apparatuses of this kind are known, for example the disclosures of Swiss Pat. No. 492,961 or of U.S. Pat. No. 3,423,999.

When measuring apparatuses of this kind are used they must incorporate, inter alia, an adjusting device which enables the deviations from the ideal linear characteristic to be eliminated by calibrating procedures, these deviations being the result of structural tolerances peculiar to the balance and proportional to the square of the value to be measured. In other words, action is taken to correct the contour of the characteristic curve of the balance. With this in view the angular position of the force transmitting member which serves to transmit a force which is a function of the value to be measured has hitherto been adjusted with respect to the two strings and to the force transmitting member by means which serve to control the pretensioning force. The angular position of this force transmitting member is thus adjusted in the plane of these four said elements by the relatively small amount which is required for arriving at the desired ideal linear characteristic of the balance. In this way it has been possible to control the degree of relative tensioning of the two strings by the force which is a function of the value to be measured; as is known, this affects the contour of the characteristic of the balance. However, this procedure has also caused an alteration in the absolute tensioning of each string by the said force which is a function of the values to be measured. This change in the absolute degree to which the strings were tensioned has resulted in a change in the steepness of the characteristic curve. The correct steepness of slope of the characteristic curve has now had to be attained by a second calibrating procedure, which does not sensibly affect the shape of the characteristic. For example, this corrective action has been carried out by altering the absolute extent to which the two strings are tensioned.

The invention has the object of enabling the contour of the characteristic curve to be corrected without altering the steepness or slope of the characteristic, this being attained by a single corrective procedure or by the use of a single correcting or adjusting element.

According to the invention an electronic apparatus comprises two pretensioned electronically excited oscillating strings each attached at one end to a movable central body, first and second force transmitting members also attached at one end to the central body, the strings and first and second force transmitting members being so arranged that they radiate from the central body in a star-like configuration, the first and second force transmitting members serving respectively to transmit to the central body a pretensioning force and a force which is a function of the mass or force to be measured, and an adjusting member by which the angles defined by the second force transmitting member with the strings and the first force transmitting member may be varied, whereby the ratio of the force transmitted by the second force transmitting member with respect to the value to be measured may be varied to compensate initial errors in the apparatus.

In one embodiment of the invention the adjusting member comprises a bellcrank through which the mass or force to be measured is transmitted to the second force transmitting member, the arm of the bellcrank which is connected to the second force transmitting member being formed with a slot set at an angle to the plane in which the bellcrank swings, the other end of the second force transmitting member being fitted with a head which engages the slot and can be locked in any position along the length of the slot in order to provide the adjustment. In another embodiment the adjusting member comprises a double armed lever through one arm of which the mass or force to be measured is transmitted to the second force transmitting member, the said one arm being so contrived that the arm can be bent into and out of the plane in which the arm swings in order to make the adjustment.

Preferred embodiments of the invention are diagrammatically illustrated in the accompanying drawings.

Figure 1:
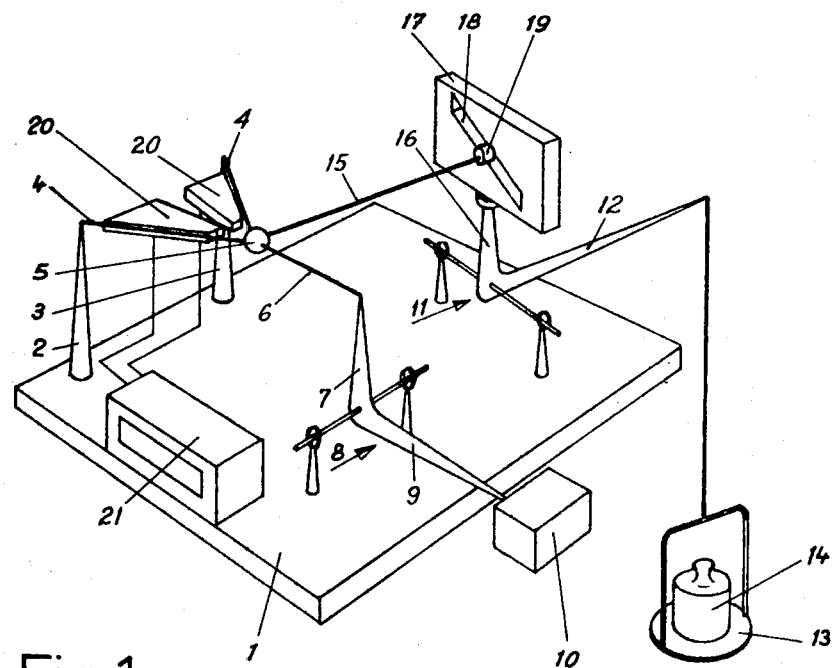
FIG. 1 is a view of the measuring apparatus as a whole.

The balance, which is diagrammatically illustrated in FIG. 1, comprises a frame 1, on which two supports 2, 3 are fixed. A transversely oscillating string 4 is arranged at the upper end of each of the supports 2, 3. One end of each of these strings 4 is fixed to a movable central body 5. A wire 6, constituting a first force transmitting member, connects the body 5 to the end of the upright arm 7 of a bellcrank 8 which is pivotally mounted on the frame 1. The longer arm 9 of bellcrank 8 which lies in a substantially horizontal position carries a pretensioning block 10, so that the moment proportional to the mass of this block 10 produces the pretensioning force, required for pretensioning the strings 4. A second bellcrank 11 is pivotally mounted on the frame 1, the horizontal arm 12 of this bellcrank 11 supporting the balance pan 13, together with the mass or object 14 which is to be weighed. A wire 15, constituting a second force transmitting member, connects the central body 5 to the vertical arm 16 of the bellcrank 11. This arm 16 terminates in a plate 17, which is itself formed with an oblique slot 18, in which a head 19 is slidable. This head 19 can be locked in any desired position within its range of sliding motion. The end of the wire 15 is attached to the head 19.

Irrespective of the position of the head 19, the wire 15 lies substantially in the plane of the strings 4 and of the wire 6. This wire 15 can only be moved by a negligible distance out of this plane.

Further, two exciter and pick-up heads 20, for producing and detecting oscillation of the strings 4, are arranged on the support 2, 3, and are connected to an evaluating and indicating device 21. In a known manner the frequency of the strings 4, recorded when these strings are merely pretensioned by the mass of the known block 10, is compared in this evaluating and display device 21 with the frequency at which these strings 4 oscillate when they are additionally loaded by way of bellcrank 11, wire 15, and central body 5 by the weight of the mass 14, whose weight is to be measured. The strings 4 are uniformly stressed by the weight of the pretensioning block 10, and are non-uniformly stressed by the weight of the mass 14, which is to be weighed. In a known manner the weight of the mass 14 is obtained from a comparison of these frequencies, and is digitally indicated.

The head 19, slidable in the oblique slot 18, is used for controlling the contour or shape of the characteristic curve of the balance. As is known, the manner in which the force, exerted by the weight of the mass 14 to be measured, and transmitted by way of wire 15, is distributed to the strings 4, is a function of the angle included between this wire 15 and wire 6. It is possible to alter both the contour and also the steepness of the characteristic curve of the balance by altering this angle, that is to say by altering the distribution of the force which acts on the strings 4 through the intermediary of wire 15. In order to restore the desired or ideal steepness of this curve, it is also necessary to alter the ratio by which the weight of the mass 14 is reduced while being transmitted to the strings 4. This ratio may be altered by appropriately changing the distance of the head 19 from the pivotal axis of the lever 11. By virtue of the oblique disposition of the slot 18 both these adjusting or calibrating processes are automatically combined so that they may take place in a single process. The angle which this slot 18 forms with the horizontal will, naturally, depend on the structural characteristics of the balance. It should be borne in mind that the force, which acts through wire 6 is appreciably greater (for example at least ten times greater) than the maximum force effective in the wire 15. Thus, if the head 19 is, for example, located a short distance below the plane of the strings 4 and of the wire 6, this will only have a very small effect on the position of the strings 4.

Figure 2:
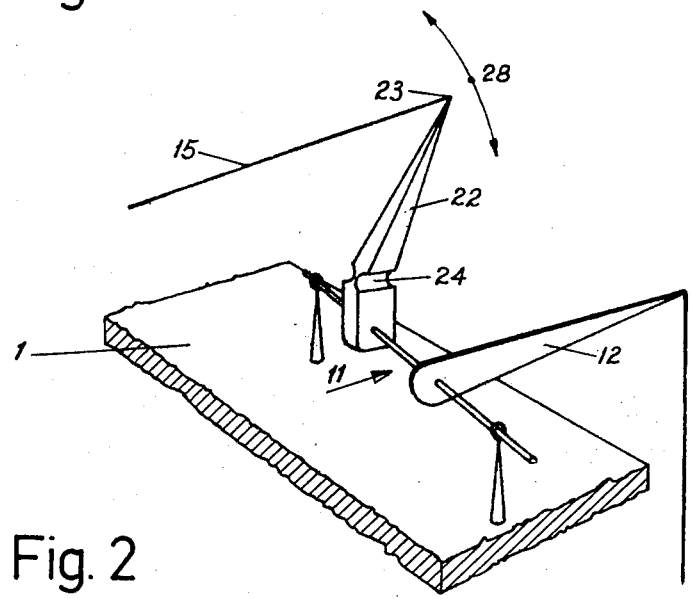
FIG. 2 is a modification in the mode of construction of the adjusting element.

FIG. 2 illustrates a modification in construction of the adjusting or calibrating element. Lever 11 consists of a first, substantially horizontal positioned arm 12, and of a second, oblique arm 22, which is disposed in the vertical plane which passes through the swivel axis of lever 11. These two arms effectively constitute a bellcrank. This oblique arm 22 is formed with a neck portion 24 of reduced cross-section, at which bending can take place. The wire 15 is attached to the tip 23 of the arm 22. The position of the tip 23 corresponds to that of the head 19 in FIG. 1. Movement of the tip 23 along a small arc, having its center point at the constriction 24, corresponds to sliding head 19 within the slot 18. This arc may coincide with its chord. The inclination of this chord corresponds to the inclination of slot 18, illustrated in FIG. 1. In order to calibrate the balance, the arm 22 may be bent about the neck 24 by means of a suitable tool.

If the bellcranks 8 and 11 are inverted, the force transmitting members 6 and 15, which are constituted by wires in the above description, could be constituted by rods, that is to say, as presser members. What is essential in both cases is that the members can transmit axial forces.

As will be apparent from the embodiment described, when the head 19 or the tip of the arm 22 alters its position, the angular position of the wires 15 relative to the strings 4 and to the wires 6 will be altered, and the distance of the right hand end of the wire 15 relative to the swivel axis of the lever 11 will also be changed. The angle included by the wires 6 and 15 will be altered, so that there will be a corresponding change in the ratio in which the two strings 4 are tensioned by the force (in this case the weight of the mass 14 to be weighed), this force being proportional to the value to be measured (in this case the object 14 to be weighed). The consequence of these changes is, in addition to the desired alteration in the contour of the characteristic curve of the balance, an undesired error in the steepness of this characteristic curve. However, this error is counteracted by an alteration in the effective length of the arm 16 (FIG. 1) or 22 (FIG. 2), this alteration resulting in a corrective or compensating "error". Thus the required control of the contour of the characteristic of the balance can be accomplished by means of a single calibrating process and without any adverse side effects.

I claim:

1. An electronic apparatus for measuring masses or forces comprising two pretensioned electronically excited oscillating strings each attached at one end to a movable central body, first and second force transmitting members also attached at one end to the central body, the strings and first and second force transmitting members being so arranged that they radiate from the central body in a star-like configuration, the first and second force transmitting members serving respectively to transmit to the central body a pretensioning force and a force which is a function of the mass or force to be measured, and an adjusting member by which the angles defined by the second force transmitting member with the strings and the first force transmitting member may be varied, whereby the ratio of the force transmitted by the second force transmitting member with respect to the value to be measured may be varied to compensate initial errors in the apparatus.

2. An apparatus according to claim 1 in which the adjusting member comprises a bellcrank through which the mass or force to be measured is transmitted to the second force transmitting member, the arm of the bellcrank which is connected to the second force transmitting member being formed with a slot set at an angle to the plane in which the bellcrank swings, the other end of the second force transmitting member being fitted with a head which engages the slot and can be locked in any position along the length of the slot in order to provide the adjustment.

3. An apparatus according to claim 1 in which the adjusting member comprises a double armed lever through one arm of which mass or force to be measured is transmitted to the second force transmitting member, the said one arm being so contrived that the arm can be bent into and out of the plane in which the arm swings in order to make the adjustment.

* * * * *